(12) United States Patent
Chaumet

(10) Patent No.: US 8,104,364 B2
(45) Date of Patent: Jan. 31, 2012

(54) VIBRATORY GYROSCOPE BALANCED BY AN ELECTROSTATIC DEVICE

(75) Inventor: Bernard Chaumet, Chatellerault (FR)

(73) Assignee: Thales (FR)

( * ) Notice: Subject to any disclaimer, the term of this patent is extended or adjusted under 35 U.S.C. 154(b) by 892 days.

(21) Appl. No.: 12/096,938

(22) PCT Filed: Dec. 7, 2006

(86) PCT No.: PCT/EP2006/069437
§ 371 (c)(1),
(2), (4) Date: Jun. 11, 2008

(87) PCT Pub. No.: WO2007/068649
PCT Pub. Date: Jun. 21, 2007

(65) Prior Publication Data
US 2008/0282833 A1 Nov. 20, 2008

(30) Foreign Application Priority Data
Dec. 13, 2005 (FR) .................................... 05 12612

(51) Int. Cl.
*G01C 19/30* (2006.01)
(52) U.S. Cl. .............................. 74/5.46; 74/5.47; 74/5.7
(58) Field of Classification Search .................... 74/5.4, 74/5.46, 5.47, 5.7–5.9
See application file for complete search history.

(56) References Cited

U.S. PATENT DOCUMENTS 5,908,986 A * 6/1999 Mitamura .................. 73/504.12
6,237,414 B1 * 5/2001 Yukawa et al. ............ 73/504.01
2004/0123660 A1 7/2004 Willig et al.
2004/0149035 A1 * 8/2004 Acar et al. ................. 73/504.12
2004/0154397 A1 * 8/2004 Platt et al. .................. 73/504.12
2005/0022596 A1 2/2005 Lehureau et al.
(Continued)

FOREIGN PATENT DOCUMENTS

WO W02004042324 5/2004
(Continued)

OTHER PUBLICATIONS

Yeh, B. Y. et al. "Modelling and Compensation of Quadrature Error for Silicon MEMS Microgyroscope." Power Electronics and Drive Systems, 2001, Proceedings, 2001 4th IEEE International Conference on, Piscataway, NJ, USA, IEEE, vol. 2, Oct. 22, 2001, pp. 871-876, XP010571645; ISBN: 0-7803-7233-6.
(Continued)

*Primary Examiner* — Ha D. Ho
(74) *Attorney, Agent, or Firm* — Lowe Hauptman Ham & Berner, LLP

(57) ABSTRACT

Described is a gyroscope with a vibrating structure, produced by micromachining in a thin wafer, which comprises a movable inertial assembly comprising at least one movable mass able to vibrate in the plane of the wafer along a drive axis x and along a sense axis y roughly perpendicular to the x-axis, an interdigital sensor comb and an interdigital drive comb. It furthermore comprises at least one additional interdigital comb, called the quadrature-error compensation comb, connected to the mass and which has two asymmetric air gaps e and $\lambda e$, $\lambda$ being a positive real number, for subjecting the mass to an adjustable electrostatic stiffness due to coupling between the x-axis and the y-axis by applying a variable DC voltage V to this comb, the adjustable stiffness allowing compensation for the quadrature error of the gyroscope.

14 Claims, 5 Drawing Sheets

U.S. PATENT DOCUMENTS

| | | |
|---|---|---|
| 2005/0050954 A1 | 3/2005 | Chaumet et al. |
| 2005/0050971 A1* | 3/2005 | Horning .......................... 74/5 R |
| 2005/0097956 A1 | 5/2005 | Chaumet et al. |
| 2006/0117849 A1 | 6/2006 | Gallon et al. |
| 2009/0272189 A1* | 11/2009 | Acar et al. ................. 73/504.16 |

FOREIGN PATENT DOCUMENTS

| | | |
|---|---|---|
| WO | WO 2004/042324 | 5/2004 |

OTHER PUBLICATIONS

Clark, W. A. et al. "Surface Micromachined Z-Axis Vibratory Rate Gyroscope." Technical Digest, IEEE Solid-State Sensor & Actuator Workshop, New York, NY, US, Jun. 3, 1996, pp. 283-387, XP001028168.

U.S. Appl. No. 11/994,825, filed Jan. 4, 2008, Rougeot et al.

* cited by examiner

VIBRATORY GYROSCOPE BALANCED BY AN ELECTROSTATIC DEVICE

CROSS-REFERENCE TO RELATED APPLICATIONS

The present Application is based on International Application No. PCT/EP2006/069437, filed on Dec. 7, 2006, which in turn corresponds to French Application No. 0512612, filed on Dec. 13, 2005, and priority is hereby claimed under 35 USC §119 based on these applications. Each of these applications are hereby incorporated by reference in their entirety into the present application.

TECHNICAL FIELD

The field of the invention is that of vibratory gyroscopes.

BACKGROUND OF THE INVENTION

Recall, with reference to FIG. 1a, the operating principle of a vibratory gyroscope.

A mass M is suspended on a rigid frame C by means of two springs of stiffness Kx and Ky. It therefore has two degrees of freedom along the x and y directions, perpendicular to each other and lying in the plane of the figure.

The system may be considered as a conjunction of two resonators of eigenfrequency Fx along x and Fy along y.

The mass M is driven along the x-axis at a frequency f and with a constant amplitude $x_0$. This frequency is generally chosen to be equal to the eigenfrequency of the mode of vibration along x. The acceleration of the mass M along x, called the drive acceleration, is then of the form:

$$\Gamma exc_x = -\omega^2 x_0 \sin(\omega t) \text{ with } \omega = 2\pi f$$

In the presence of a rotation speed $\Omega$ around the third axis z, the Coriolis forces cause a coupling between the two resonators giving rise to a vibration of the mass along the y-axis, often called the sense axis. An acceleration, called Coriolis acceleration, appears along the y-axis:

$$\Gamma cor_x = 2\Omega \omega x_0 \cos(\omega t)$$

The measurement of the rotation speed $\Omega$ is therefore made through measuring the movement along y caused by the Coriolis acceleration. In fact, the amplitude of the movement along y is proportional to the rotation speed $\Omega$.

However, due to geometric imperfections in the mass, the x and y axes lack orthogonality as illustrated in FIG. 1b. Due to this nonorthogonality $\alpha$, the acceleration along the sense axis y includes not only the Coriolis acceleration but also a component coming from the projection on y of the drive acceleration:

$$\Gamma y = 2\Omega \omega x_0 \cos(\omega t)\cos \alpha - \omega^2 x_0 \sin(\omega t)\sin \alpha$$

Assuming that $\alpha$ is very small compared with 1, this yields:

$$\Gamma_y = 2\omega x_0 \left(\Omega \cos(\omega t) - \alpha \frac{\omega}{2} \sin(\omega t)\right)$$

Hence it is observed that an interference term $\alpha \omega/2 \sin(\omega t)$ is superposed on the term $\Omega \cos(\omega t)$ representing the useful information to be measured. This interference term, in phase quadrature with the useful term, is generally called quadrature error.

As the interference signal is in phase quadrature with the useful signal, it may be eliminated by demodulation. However, demodulation which is not perfect includes a phase error $\Delta\phi$ which introduces an error to the speed measurement:

$$\Omega mes \approx \Omega - \alpha \frac{\omega}{2}\Delta \phi$$

To obtain a stability of 10°/h in the speed measurement, the term $$\alpha \frac{\omega}{2}\Delta\phi$$

must have a stability of 10°/h.

For a phase stability of 100 μrad (or 0.0057°) with a frequency $\omega = 2\pi \cdot 10000$ rad/s, the nonorthogonality $\alpha$ must therefore be less than 15 μrad in order to obtain a stability of 10°/h.

Geometric defects in the sensing element generally lead to a nonorthogonality of a few hundred microradians.

To obtain the sought precision in the speed measurement, it is therefore necessary to reduce the nonorthogonality, which amounts to compensating for the quadrature error. This process is often called balancing.

With equal stability performance on the speed measurement, the reduction in quadrature error also allows a relaxation in the necessary phase precision $\Delta\Phi$.

The balancing operation therefore has two objectives: to improve the precision in the speed measurement and/or relax the phase precision of the electronics.

A first method for carrying out the balancing or the orthogonalization of the drive and sense axes is to remove some material locally (laser ablation for example) so as to modify the distribution of mass or of the stiffness linked with the mass M. This method is generally expensive to implement and is difficult to apply to a micromachined planar vibratory gyroscope, the sensing and drive movements of which are situated in the plane of the substrate.

Another method consists in deforming the movable mass and possibly the stiffness elements of the sensing or drive movement in such a way that the drive and sensing movements become orthogonal. This static deformation may then be carried out by applying electrostatic forces to the mass or to its movable elements. This method is described, for example, in the Patent WO 2004/042324.

A final method consists in using an electrostatic field not to deform the stiffness elements as in the preceding method, but to modify the distribution of the stiffness of the system using an electrostatic stiffness. This type of method is currently employed on certain types of vibratory gyroscope such as vibrating ring or cup gyroscopes, but until now has never been implemented on micromachined planar vibratory gyroscopes, with a simple or double tuning fork, the sensing and drive movements of which are linear and situated in the plane of the substrate.

SUMMARY OF THE INVENTION

The aim of the invention is to allow compensation for the quadrature error of a micromachined planar vibratory gyroscope, the sensing and drive movements of which are linear and situated in the plane of the substrate.

More precisely, the subject of the invention is a gyroscope with a vibrating structure, produced by micromachining in a thin wafer, which comprises a movable inertial assembly comprising at least one movable mass able to vibrate in the plane of the wafer along a drive axis x and along a sense axis y roughly perpendicular to the x-axis, an interdigital sensor comb and an interdigital drive comb. It is mainly characterized in that it furthermore comprises at least one additional interdigital comb, called the quadrature-error compensation comb, connected to the mass, and which has two asymmetric air gaps e and λe, λ being a positive real number, for subjecting the mass to an electrostatic stiffness due to coupling between the x-axis and the y-axis by applying a variable DC voltage V to this comb; this adjustable stiffness allows compensation for the quadrature error.

This quadrature-error compensation comb allows modification of the stiffness distribution of the gyroscope without deforming the stiffness elements of the drive or sensing movements.

According to a feature of the invention, the quadrature-error compensation comb(s) is (are) arranged along the sense axis y.

Preferably, when the movable inertial assembly has a symmetry axis parallel to the x-axis, it comprises a second quadrature-error compensation comb, the two compensation combs being arranged symmetrically in relation to the symmetry axis and the second comb having along y two air gaps symmetrical to the air gaps of the first comb relative to this symmetry axis.

When the movable inertial assembly has a symmetry axis parallel to the y-axis, it optionally comprises a third and a fourth quadrature-error compensation comb, these two compensation combs being respectively symmetrical to the first and second combs in relation to the symmetry axis along y or in relation to the intersection between the symmetry axis parallel to x and the symmetry axis parallel to y.

According to another feature of the invention, the movable inertial assembly includes a second mass able to vibrate along the sense axis y, and optionally a third mass able to vibrate in opposite phase to the second mass along the sense axis y.

Advantageously, the movable inertial assembly furthermore comprises at least one interdigital comb for adjusting the sensing frequency which has two identical air gaps e and which is linked with a mass able to vibrate along the sense axis y.

According to a feature of the invention, the comb for adjusting the sensing frequency is positioned along the y-axis.

When the movable assembly is designated the first movable assembly, it advantageously comprises a second movable assembly which comprises the same elements as the first movable assembly and a coupling structure that links these two assemblies to each other and allows a transfer of mechanical vibration energy between them.

The gyroscope is, for example, a simple or double tuning fork gyroscope.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

From one figure to the next, the same elements are marked by the same references.

DETAILED DESCRIPTION OF THE INVENTION

Figure 1A:
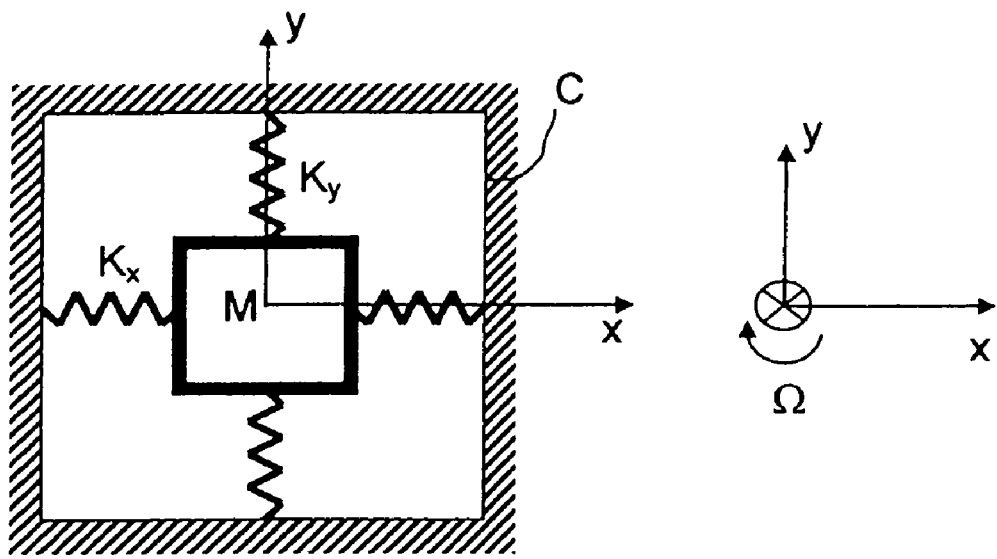
FIGS. 1a and 1b, already described, schematically show a perfect gyroscope and a gyroscope exhibiting a nonorthogonality.

A fault-free vibratory gyroscope may be represented as a dynamic system comprising two orthogonal modes of vibration of identical frequency and perfectly decoupled. This perfect system is shown in FIG. 1a. The dynamic stiffness matrix Kdyn of this system is a 2×2 matrix which has the property of being diagonal.

This matrix is hence of the following form:

$$[Kdyn] = -\omega^2 \begin{bmatrix} M_x & 0 \\ 0 & M_y \end{bmatrix} + \begin{bmatrix} K_x & 0 \\ 0 & K_y \end{bmatrix}$$

$M_x$ and $K_x$ represent the effective mass and stiffness of the mode of resonance along x.

$M_y$ and $K_y$ represent the effective mass and stiffness of the mode of resonance along y.

$$\begin{bmatrix} M_x & 0 \\ 0 & M_y \end{bmatrix}$$

is the mass matrix, and $$\begin{bmatrix} K_x & 0 \\ 0 & K_y \end{bmatrix}$$

is the mechanical stiffness matrix.

The nonorthogonality α has the effect of modifying the mass and stiffness matrices in the following manner:

$$[Kdyn] = -\omega^2 \begin{bmatrix} M_x & 0 \\ 0 & M_y \end{bmatrix} + \begin{bmatrix} K_x & (-K_x\alpha) \\ (-K_x\alpha) & (K_y + K_x\alpha^2) \end{bmatrix}$$

Note the appearance of cross terms proportional to the nonorthogonality α, at the origin of the quadrature error.

The balancing principle is to modify the dynamic stiffness matrix so as to render it diagonal.

Hence in the case of "electric" balancing, using an electrostatic device, the dynamic stiffness matrix is modified by superposing an electrostatic stiffness matrix:

$$[Kdyn] = -\omega^2 \begin{bmatrix} M_x & 0 \\ 0 & M_y \end{bmatrix} + \begin{bmatrix} K_x & (-K_x\alpha) \\ (-K_x\alpha) & (K_y + K_x\alpha^2) \end{bmatrix} + \begin{bmatrix} k_x & k_{xy} \\ k_{xy} & k_y \end{bmatrix}$$

$$\begin{bmatrix} k_x & k_{xy} \\ k_{xy} & k_y \end{bmatrix}$$

being the electrostatic stiffness matrix.

$k_x$ and $k_y$ being direct electrostatic stiffness terms, $k_{xy}$ being a transverse or coupling electrostatic stiffness term.

The aim of the electrostatic balancing, which is therefore to diagonalize the dynamic stiffness matrix to cancel out the quadrature error, is obtained when $k_{xy} = K_x\alpha$.

Once the diagonalization of the matrix has been carried out, it is also possible to make the resonant frequency of the two modes equal, which is obtained when:

$$-\omega^2 M_x + K_x + k_x = 0 = -\omega^2 M_y + K_y + K_x\alpha^2 + k_y$$

or:

$$\frac{K_x + k_x}{M_x} = \frac{K_y + K_x\alpha^2 + k_y}{M_y}$$

The cancelling out of the resonant frequency difference between the two modes is strictly possible only when the stiffness matrix is diagonal and hence when the quadrature error has been canceled out.

The direct electrostatic stiffness terms $k_x$ and $k_y$ are by nature negative. The term $k_x$ therefore has the effect of reducing the frequency of the mode x and the term $k_y$ therefore has the effect of reducing the frequency of the mode y.

In order to make the frequencies equal, the stiffness $k_y$ is acted on if the frequency of the mode y is greater than that of the mode x, and the stiffness $k_x$ is acted on if the frequency of the mode x is greater than that of the mode y.

A means will now be presented of obtaining these stiffness terms on a micromachined planar vibratory gyroscope, the sensing and drive movements of which are linear and situated in the plane of the substrate. As a preliminary, recall the structure of such a gyroscope which comprises one or more movable masses.

A thin planar silicon wafer is machined to make a gyroscope, the sense axis of which is perpendicular to the plane of the wafer designated the xy-plane and the drive and sensing movements of which are situated in the plane of the wafer.

Silicon is chosen as preferred material, first for its mechanical properties and second for its high conductivity when it is sufficiently doped with an appropriate impurity (in general boron for p-type silicon).

The thickness of the original silicon wafer is, for example, a few hundred micrometers; the wafer comprises on the one hand stationary anchoring areas formed in this thickness and on the other hand the actual vibrating structure, free in relation to the anchoring areas and formed at less thickness, for example at a thickness of several tens of micrometers, isolated from the rest of the thickness of the wafer by a narrow gap. At this thickness of several tens of micrometers the silicon wafer is cut by micromachining according to the desired patterns of movable masses and interdigital combs.

Figure 3A:
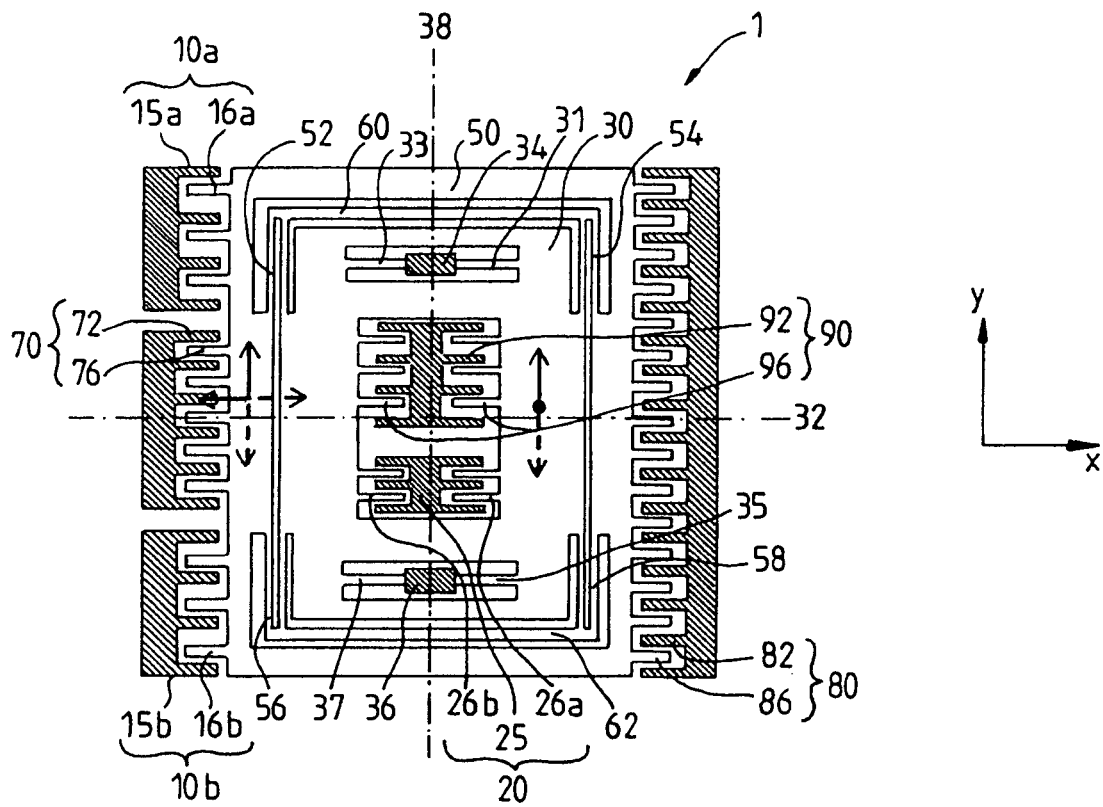
FIGS. 3a and 3b schematically show examples of a gyroscope according to the invention with two masses.
Figure 4:
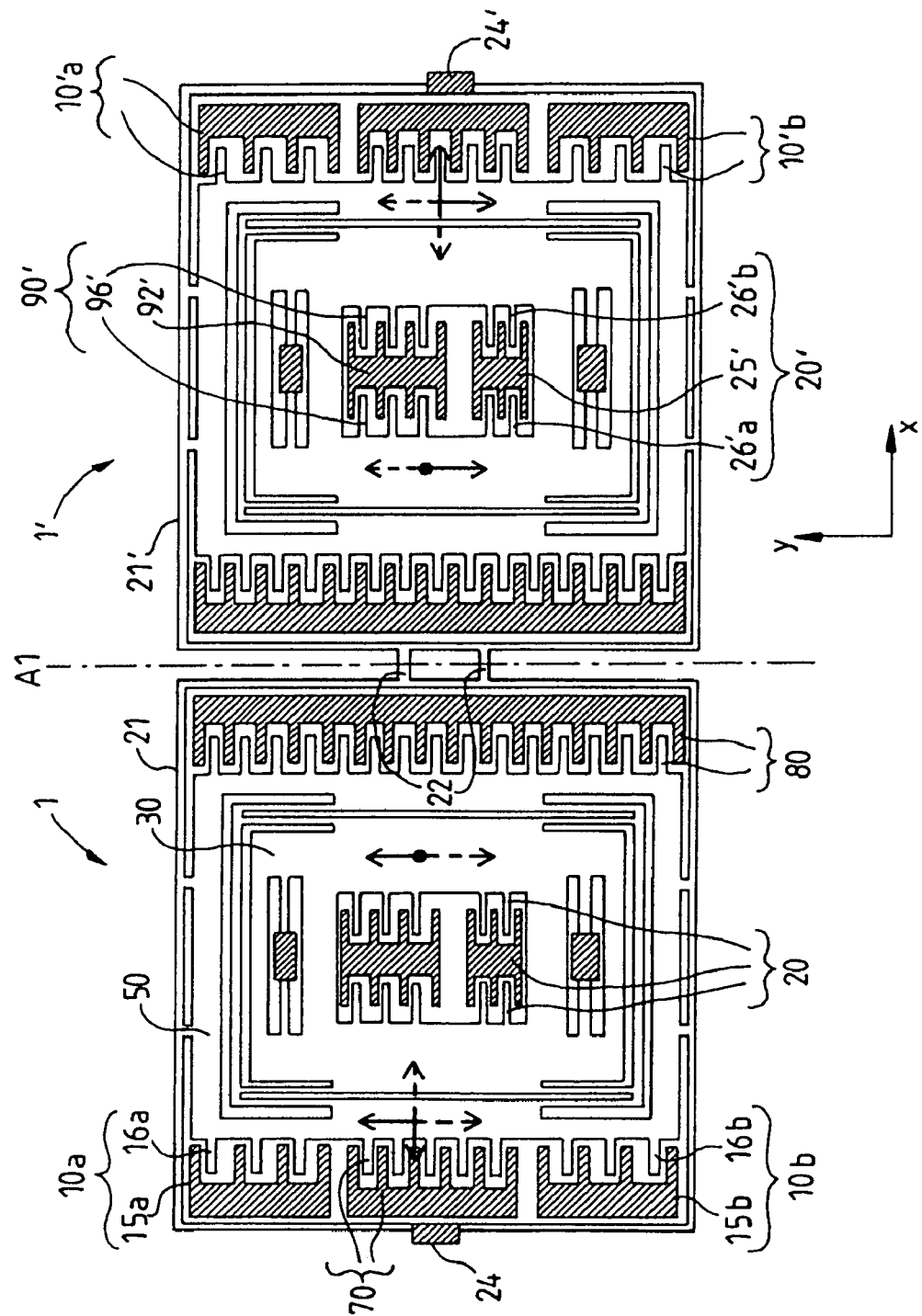
FIG. 4 schematically shows an example of a gyroscope according to the invention with four masses, called a simple tuning-fork gyroscope.
Figure 5:
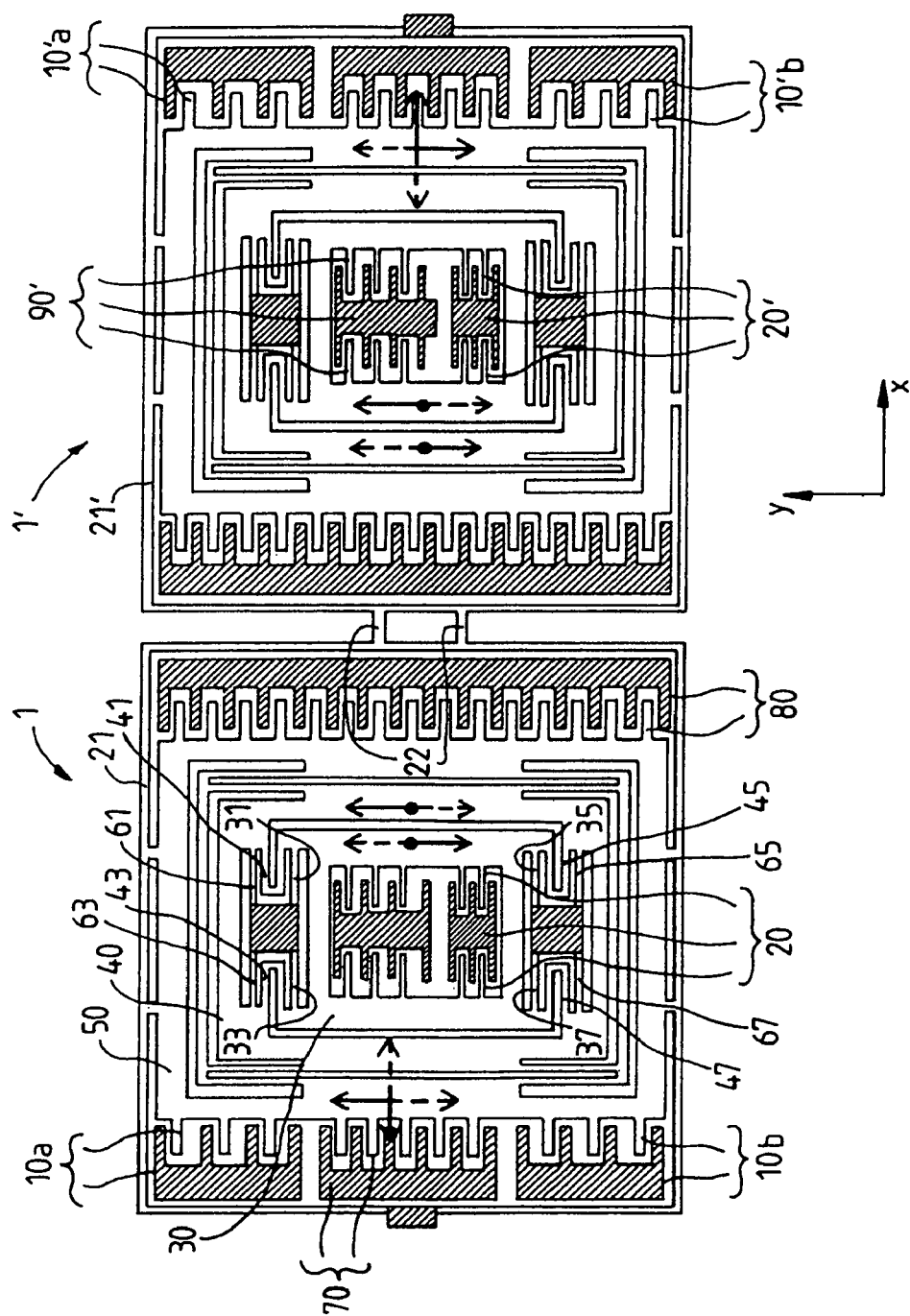
FIG. 5 schematically shows an example of a gyroscope according to the invention with six masses, called a double tuning-fork gyroscope.

The machining of the structure may be carried out by using a substrate of silicon on an insulator as the original substrate, but other methods are also possible. A substrate of silicon on an insulator consists of a silicon substrate of a few hundred micrometers thickness bearing on its front face a fine layer of silicon oxide which is itself covered with a layer of monocrystalline silicon several tens of micrometers thick. The machining consists of etching the silicon substrate through its front face, according to the desired surface patterns, by means of photoetching techniques used in microelectronics, until the oxide layer is reached, with a selective etching product that etches the silicon without significantly etching the oxide. The etching is stopped when the oxide layer has been exposed. This oxide layer is then removed by selective etching with another product so as to preserve only the surface layer of monocrystalline silicon, except in the location of the anchoring areas where the oxide layer subsists and forms an integral link between the substrate and the surface layer of monocrystalline silicon. The machining through the front face defines the various cutting of the movable parts. It is thus these surface patterns, anchoring areas and cutting of the moving parts that are seen in FIGS. 3 to 5.

The silicon conductor allows the electrical functions of the gyroscope and notably the drive functions and the sensor functions to be carried out. These functions are preferably carried out by drive and sensor combs. These are capacitive combs with interdigital electrodes supplied with an electric current or voltage. A comb comprises a stationary half-comb and a movable half-comb. The stationary part of a comb is fixed to an anchoring area, also forming electrical access for the transmission of electrical signals to this stationary part or from this stationary part; the movable part of the comb is fixed to a movable element of the drive structure or of the sensing structure; the area(s) for anchoring the movable mass form an electrical access to the movable part of the comb, via the assembly of the vibrating structure.

The teeth or fingers of the stationary half-comb, made of conductive silicon machined at the same time as the other elements of the gyroscope, constitute the first plate of a capacitor and the teeth or fingers of the movable half-comb, also made of conductive silicon, constitute the second plate of this capacitor.

Figure 2A:
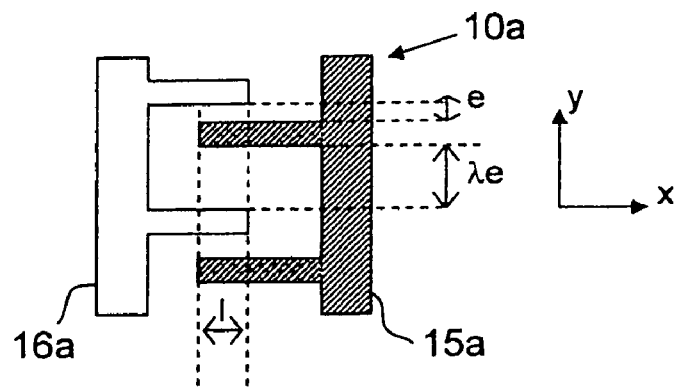
FIGS. 2a, 2b and 2c schematically show examples of quadrature-error compensation combs and frequency adjustment combs, and the vibration axes between fixed comb and movable comb.

The gyroscope according to the invention comprises in addition to the drive and sensor combs, a quadrature-error compensation comb 10a shown in FIG. 2a. In fact, the stiffness term $k_{xy}$, which allows the quadrature error to be compensated for, is obtained by means of an assembly of interdigital half-combs, one 15a of which is movable, the other 16a stationary. The interdigitation of the combs, also called air gaps, is asymmetric at rest, the fingers of one half-comb not being exactly in the middle of the gap between two fingers of the other half-comb; at rest there are asymmetric air gaps e and $\lambda$e, $\lambda$ being a positive real number.

The movable half-comb 15a is joined to the mass that is able to vibrate along x and along y. It is therefore the mass that ensures the Coriolis coupling. The arrows indicate the possible movement along x or along y between the stationary comb 16a and the movable comb 15a.

The electrostatic stiffness terms created by such a comb are the following:

$$k_{xq} = 0$$

$$k_{yq} = n\varepsilon V^2 \frac{hl}{e^3}\left(1 + \frac{1}{\lambda^3}\right)$$

-continued $$k_{xyq} = \frac{n\varepsilon V^2}{2} \frac{h}{e^2}\left(1 - \frac{1}{\lambda^2}\right)$$

the subscript q signifying that the stiffness term is due to the quadrature compensation comb, n being the number of teeth per half-comb;

h the thickness of the comb, which is also that of the silicon wafer;

l the length of the overlap;

V the DC voltage between each comb; and

ε the permittivity of the vacuum.

According to a variant, the stationary half-comb comprises n teeth and the movable half-comb n−1 teeth.

This type of comb therefore allows a coupling stiffness $k_{xyq}$ to be created essentially. This coupling stiffness, which is positive, is adjusted depending on V so as to obtain $k_{xyq} = K_x\alpha$, i.e. to compensate for the quadrature error equal to $$\alpha\frac{\omega}{2}.$$

Figure 2B:
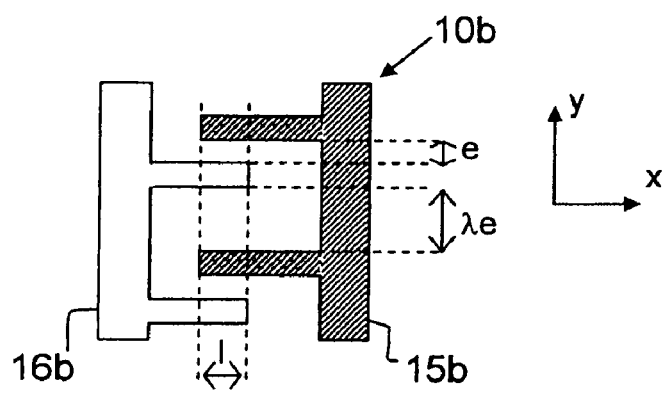

As the error to be compensated for may have any sign at all, another comb is provided, symmetric with the previous one in relation to a symmetry axis of the gyroscope along x, in order to create a negative stiffness term. An example of this comb 10b, symmetric with the previous one, is shown in FIG. 2b. It comprises a movable half-comb 15b and a stationary half-comb 16b. At rest the air gaps e and λe are asymmetric.

For example, for a drive frequency ω=2π·8000 rad/s, a mass Mx=My=1 μgram and a maximum nonorthogonality α of 200 μrad, the quadrature error to be compensated for, expressed in °/s, is then 288°/s at maximum.

To compensate for this quadrature error, it is necessary to create an electrostatic coupling stiffness $k_{xyq} = K_x\alpha = M_x\omega_x^2\alpha = 0.5$ N/m.

With an electrostatic compensation comb with the characteristics n=100 teeth, e=3 μm, h=100 μm and λ=3, it therefore suffices to apply a DC voltage V=10.6 Volts to create an electrostatic coupling stiffness of 0.5 N/m and hence to compensate for the nonorthogonality of 200 μrad.

The application of the DC voltage to the quadrature compensation combs creates not only a coupling stiffness $k_{xyq}$, but also a direct electrostatic stiffness $k_{yq}$ which has the effect of reducing the frequency of the mode y. This frequency reduction may be a nuisance if it makes the frequency difference Fy−Fx negative, because it then becomes impossible to cancel out this frequency difference through the comb for adjusting the frequency Fy.

But the length of overlap of the quadrature adjustment comb may be chosen in such a way that the direct stiffness term $k_{yq}$ is sufficiently low for the frequency difference Fy−Fx between the sense mode and the drive mode always to remain positive when applying the voltage V that is intended to compensate for the quadrature error.

Returning to the previous example, with a nominal frequency difference of 200 Hz between the two modes and manufacturing tolerances causing a maximum difference of ±100 Hz between one gyroscope and another. The choice of a length of overlap I=50 μm leads to a direct stiffness $k_{yq}$=−20 N/m for a coupling stiffness $k_{xyq}$=0.5 N/m. The frequency reduction induced by this stiffness is then 30 Hz at maximum. The frequency difference Fy−Fx between the sense and drive mode therefore always remains positive as it is equal to a minimum of 200−100−30=70 Hz and a maximum of 200+100−30=270 Hz.

Figure 2C:
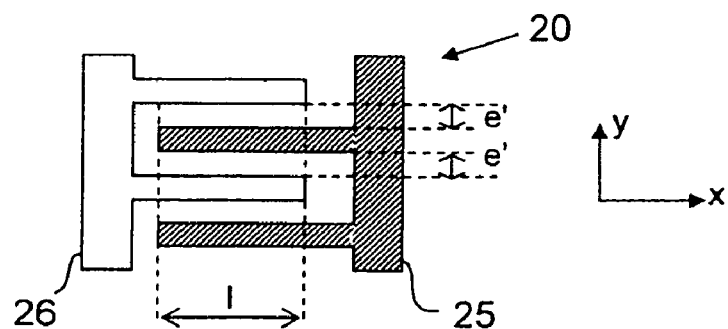

Once the quadrature error has been compensated for, the final adjustment of the frequency difference is carried out by an additional comb, designated the frequency adjustment comb 20, an example of which is shown in FIG. 2c. The adjustment of the frequency difference Fy−Fx, which is always positive before adjustment, is carried out by reducing the frequency Fy. This reduction is caused by the introduction of an electrostatic stiffness $k_{yf}$ that is by nature always negative. The subscript f signifies that the stiffness terms are caused by the frequency adjustment comb. The stiffness $k_y = k_{yq} + k_{yf}$.

The stiffness term $k_{yf}$ is obtained by an assembly of interdigital half-combs, one 25 of which is movable, the other 26 stationary. At rest the air gaps e' are symmetric: the fingers of one half-comb are in the middle of the gap between the fingers of the other half-comb. The movable half-comb is joined to the mass that is able to vibrate along y. The arrow indicates the possible movement along y between the stationary comb 26 and the movable comb 25.

The electrostatic stiffness terms created by this comb for final adjustment of the frequency difference are the following:

$$k_{xf} = 0$$

$$k_{yf} = -2n\varepsilon V^2 \frac{hl}{e'^3}$$

$$k_{xyf} = 0$$

Hence, this type of comb allows reduction of the stiffness along y depending on the voltage V without modifying the stiffness $k_x$ and without introducing a coupling stiffness $k_{xy}$.

Figure 1B:
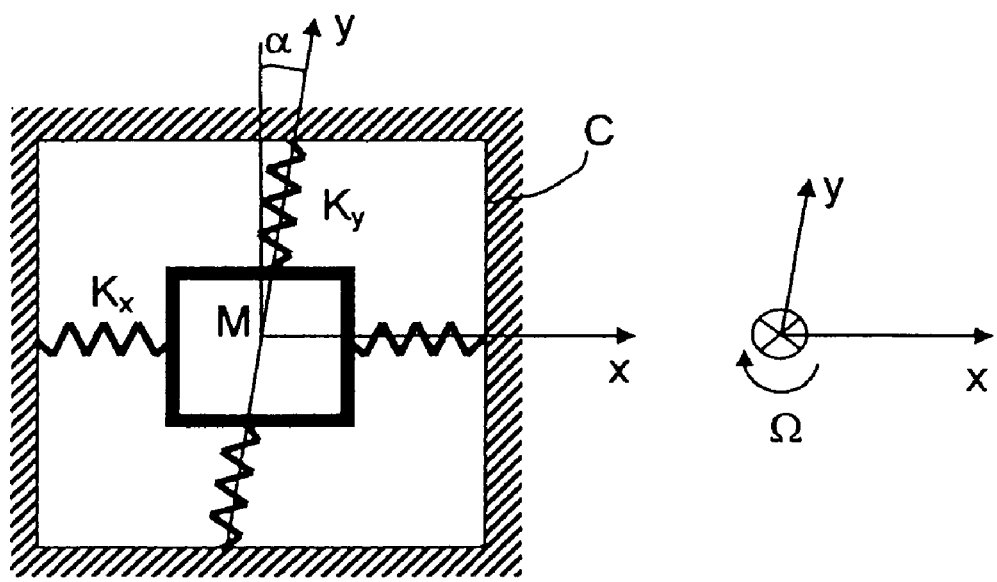

In the case of a gyroscope with a single mass, this mass being able to vibrate along x and y, as in the example gyroscope of FIG. 1b, the quadrature-error compensation comb and that for adjusting the frequency are therefore associated with the same mass.

In reality, the vibrating structure of a micromachined planar vibratory gyroscope, the sensing cord drive movements of which are linear and situated in the plane of the substrate, generally comprises two, four, six or eight masses.

Among this set of masses, some are able to vibrate along x and y, and others only along x or only along y.

The masses able to vibrate simultaneously along the two axes x and y ensure the Coriolis coupling between the drive axis and the sense axis. It is to these masses that the movable part of the combs is fixed, allowing compensation for the quadrature error by monitoring the coupling stiffness $k_{xy}$.

The movable part of the combs ensuring adjustment of the frequency Fy of the sense mode by monitoring the stiffness $k_y$ must be joined to the masses able to vibrate along y, which may optionally be the same masses as those able to vibrate along x and y.

An example of a gyroscope according to the invention with two movable masses will now be described.

The FIG. 3 provide one arrangement among others of the various combs on such a gyroscope.

The movable inertial assembly 1 of this gyroscope comprises an inertial frame as a first movable mass and a central movable inertial mass as a second movable mass.

The movable inertial mass, also called the proof mass 30, can only move along a sensing direction, for example Oy (vertical axis in the plane of the figure); the inertial frame 50 can move along the axis Ox or along the axis Oy. The sense axis of the gyroscope is an axis Oz perpendicular to the plane of the wafer. The inertial frame 50 is vibrated in the Ox direction; when the gyroscope rotates about its sense axis Oz, a vibration of the frame along the Oy axis is generated. This vibration along Oy is transmitted to the mass 30, while the vibration along Ox is not transmitted. As will be seen, a structure for driving the vibration is associated with the frame 50 and a structure for sensing vibration is associated with the inertial proof mass 30.

As can be seen in the FIG. 3, the proof mass 30 is connected to the stationary anchoring areas by at least two flexural beams, designed to allow movement of the mass along Oy but to prevent any significant movement of the mass in the Ox direction. These beams are preferably situated on both sides of a symmetry axis 32 of the mass, parallel to Ox. There are hence two anchoring areas 34 and 36 situated on both sides of the proof mass, symmetrically in relation to this symmetry axis 32. In addition, these areas are preferably situated on another symmetry axis 38 of the mass, which axis is parallel to Oy. The flexural beams which connect the mass 30 to the areas 34 and 36 are beams extended in the Ox direction, so as to exhibit a high stiffness (high resistance to extension) in this direction. There are preferably four flexural beams rather than two, the mass being connected to the anchoring area 34 by two beams 31 and 33 on both sides of the area 34; the mass is in addition connected to the second anchoring area 36 by two beams 35 and 37 on both sides of the area 36.

The movable frame 50 preferably completely surrounds the mass 30. The mass 30 is connected to the frame 50 by at least two flexural beams which have the particular feature of having a very high stiffness (very high resistance to extension) in the Oy direction and a low stiffness in the Ox direction. These beams are extended in the Oy direction and have a low width in comparison with their length in order to exhibit this difference in stiffness.

There are preferably four flexural beams of this type between the mass 30 and the frame 50, each of the beams being situated in practice at one corner of the proof mass, if it is generally rectangular in shape. They are arranged symmetrically first in relation to the symmetry axis 32 of the mass (axis parallel to Ox) and second in relation to the symmetry axis 38 (parallel to Oy).

These beams are designated by the references 52, 54, 56 and 58. They are preferably in a folded U-shape. The two folded branches of the U are extended parallel to Oy and are connected to each other by a short connecting element. The beams 52 to 58 may, however, not be folded and extend completely in the Oy direction between the frame and the mass. The folding allows space to be saved without significantly modifying the desired mechanical features.

If the beams are folded, as in FIG. 3, it is preferable in addition to connect the short connecting element (which connects the two branches of the U) of a first beam 52 to the corresponding short element of the beam 54, which is symmetric with the beam 52 in relation to the axis 38. A crosspiece 60, parallel with Ox, is provided to this end, for connecting the base of the U of the connecting beam 52 to the base of the U of the flexural beam 54, the beams 52 and 54 being symmetric in relation to the axis 38. A similar crosspiece 62, symmetric with the crosspiece 60 in relation to the axis 32, connects the symmetric elements 56 and 58. These crosspieces 60 and 62, parallel to Ox, reinforce the symmetry of transmission of a movement along Oy applied by the movable frame 50 to the mass 30. They are not present if the beams 52, 54, 56 and 58 do not have a folded shape, as in this case the ends of the beams 52 and 54 would already be connected rigidly by the frame 50 itself.

As can be seen in the FIG. 3, the extended-U folded shape of the flexural beams between the movable frame 50 and the proof mass 30 is obtained by cuts in the movable frame and in the proof mass, but generally speaking the flexural beams start roughly in an inner corner of the frame going toward an opposite corner of the mass, even if the actual fixing point of the beam on the frame or on the mass does not start exactly from this corner. The mass may be considered to be suspended globally by its four corners on the movable frame.

The frame 50 is driven in vibration along Ox by a first interdigital comb structure 70 with symmetric air gaps, which comprises a stationary half-comb 72 attached to an anchoring area and a movable half-comb 76 constituted along a first side (parallel to Oy) of the frame 50. Conventionally, the comb structure acts to drive movement of the movable part due to the forces of attraction exerted between the facing fingers when a voltage is applied between the half-combs. The drive voltage alternates to generate a vibratory movement and the frequency of this voltage is chosen to be very close to or equal to the mechanical resonant frequency of the structure. The drive voltage is applied between the anchoring area of the half-comb and one and/or the other of the anchoring areas 34 and 36. The stationary half-comb 72 is in direct electrical contact (through the body of the conductive silicon) with its anchoring area; the movable half-comb 76 is in contact with the anchoring areas 34 and 36 by means of the flexural beams 52 to 58, the body of the proof mass, the flexural beams 40 to 46 and the frame 50, such that by applying a voltage between the anchoring area of the half-comb and the anchoring areas 34 or 36, a voltage is indeed applied between the stationary part and the movable part of the comb 70.

The drive movement generated on the frame 50 is in the Ox direction, the combs acting by modifying the area of mutual overlap of the intercalated fingers.

The microgyroscope preferably comprises another interdigital comb structure linked with the frame, symmetric with the structure 70 in relation to the axis 38. It comprises a stationary half-comb 82 attached to an anchoring area and a movable half-comb 86 machined along one side of the frame 50. This structure with symmetric air gaps may serve as a sensor of movement of the frame along Ox. It is useful for controlling the movement excited by the comb 70; the control is in general useful for adjusting the drive frequency relative to the resonant frequency of the structure. The voltages detected by the structure 80 appear between the anchoring area of the half-comb and the anchoring areas 34 and 36.

At least one interdigital comb is associated with the proof mass 30 for sensing the movement of the proof mass in the Oy direction. The orientation of these combs depends on the principle on which the sensing is based. If the sensing is based on a measurement of variations in the mutually overlapping area of the fingers of the stationary and movable half-combs, the comb for sensing movements along Oy is arranged perpendicular to the drive comb 70 (which is also based on variations in the overlapping surface). But if the sensing is based on a measurement of variations in the space between the fingers of the stationary half-comb and of the movable half-comb, the sensor comb is arranged parallel to the drive comb. Sensing by the variation in the space between fingers is preferred as it is more sensitive. The air gaps are then asymmetric at rest, the fingers of one half-comb not being exactly in the middle of the gap between two fingers of the other half-comb, while a comb functioning (as the drive comb) on the basis of variations in the overlapping surfaces has the fingers of one half-comb in the middle of the gap between the fingers of the other half-comb.

This is the case in the FIG. 3: the sensor comb 90 is arranged with the same general orientation as the combs 70 and 80, although it is associated with a movement along Oy whereas the combs 70 and 80 are associated with a movement (drive or sensing) along Ox. It is arranged in the center of the mass along the axis 38.

The comb 90 comprises a stationary half-comb 92 attached to an anchoring area and a movable half-comb 96 which is part of the proof mass itself. The proof mass includes a cut-out to allow space for the stationary comb 92 and its anchoring area, and the edges of this cut-out are cut in the form of fingers to constitute the movable half-comb 96 in which the fingers of the stationary half-comb intercalate. In the example shown the comb 90 is double, i.e. the stationary half-comb 92 situated on the axis 38 comprises fingers on both sides of the symmetry axis 38, and the two sides of the cut-out from the mass 30 are provided with fingers to form two movable half-combs 96a and 96b situated on both sides of the axis 38.

For the sensing of movement along Oy, an electronic circuit associated with this structure senses the amplitude modulation of the electric voltages present between the anchoring area of the half-comb and the anchoring areas 34 and 36. This modulation is due only to a movement of the proof mass along the Oy axis, as the mass can only move along this axis.

According to the invention, a quadrature-error compensation comb 10a, such as described in relation to the FIG. 2a, is added to this gyroscope. It is associated with the frame 50 that is able to vibrate along x and along y; the movable half-comb 16a is joined to this mass 50 and the stationary half-comb 15a is attached to an anchoring area. It is arranged along a first side (parallel to Oy) of the frame 50 in the continuation of the comb 70 for exciting movement along x.

This quadrature-error compensation comb allows the orthogonality between the sensing and drive movement to be modified by modifying the stiffness due to coupling between the sense axis and the drive axis, without deforming the stiffness elements of the drive or sensing movements.

As the errors to be compensated for may have any sign at all, another comb 10b is provided, as described in relation to FIG. 2b, to create a stiffness term with a sign opposed to that created by the comb 10a. These two compensation combs 10a and 10b are arranged symmetrically in relation to the axis 32 and the air gaps e and λe of the first comb are symmetric with the air gaps of this second comb in relation to this axis 32.

Figure 3B:
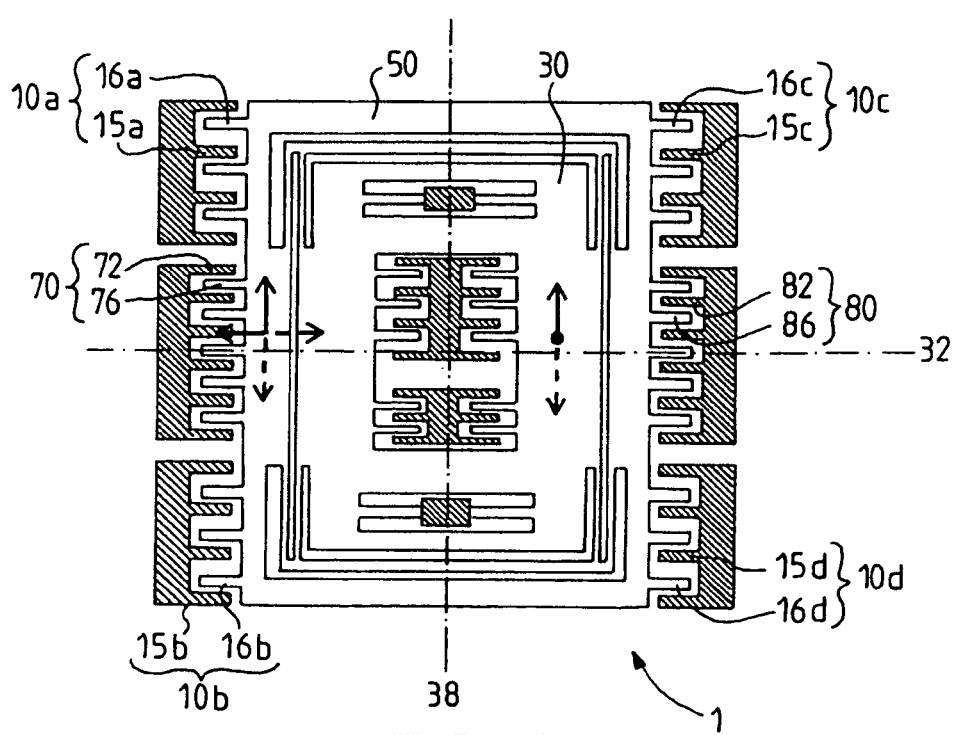

As indicated in FIG. 3b, it is also possible to provide quadrature-error compensation combs 10c and 10d, arranged on the other side parallel to Oy. They are then symmetric with the combs 10a and 10b in relation to the axis 38 or may indeed also be symmetric with the combs 10a and 10b in relation to the point of intersection of the axes 38 and 32.

Preferably, a comb 20 for adjusting the frequency Fy, as described in relation to FIG. 2c, is added to this gyroscope of FIG. 3a or 3b. It is associated with the mass 30 that is able to vibrate along y. It is positioned at the center of the mass 30 along the axis 38 in the continuation of the sensor comb 90. It comprises a stationary half-comb 25 attached to an anchoring area and a movable half-comb 26 which is part of the proof mass itself. The proof mass includes a cut-out to allow space for the stationary comb 25 and for the anchoring area, and the edges of this cut-out are cut in the form of fingers to constitute the movable half-comb 26 in which the fingers of the stationary half-comb intercalate. In the example shown the comb 20 is double, i.e. the stationary half-comb 25 situated on the axis 38 comprises fingers on both sides of the symmetry axis 38, and the two sides of the cut-out from the mass 30 are provided with fingers to form two movable half-combs 26a and 26b situated on both sides of the axis 38.

According to another embodiment of the invention, the combs for quadrature-error compensation and frequency adjustment are produced on a tuning-fork gyroscope, two examples of which are shown in FIGS. 4 and 5.

A gyroscope structure of the tuning-fork type is a symmetric structure comprising two movable inertial assemblies 1 and 1' vibrating in opposite phase, these movable assemblies being connected to each other by a coupling structure that serves to transmit without loss, from one assembly to the other, the mechanical vibration energies of the two assemblies to establish the phase opposition of these vibrations. The symmetry of the structure is a symmetry in relation to an axis A1 parallel to the x-axis, with a movable assembly on each side of this axis.

The coupling structure preferably consists of two externally rectangular frames 21 and 21', inside which the movable inertial assemblies are situated. The frames 21 and 21' are connected to each other by a short connecting bar 22 which may be considered rigid. The connecting bar 22 connects the middle of one side of the first frame to the middle of an adjacent side of the second frame. It constitutes a center of symmetry of the whole structure; it is perpendicular to the axis A1 and centered on this axis. The short connecting bar 22 may be a double bar, also centered on the axis A1, as in the examples of the FIGS. 4 and 5.

The external frames 21 and 21' of the coupling structure in principle surround the two movable assemblies by at least three sides and they are preferably connected to these two assemblies along sides perpendicular to the general symmetry axis A1. The frames 21 and 21' may (optionally) each be fixed to an anchoring area 24, 24' situated in the middle of a side opposite the side connected to the connecting bar 22. In this case, the frames 21 and 21' each completely surround a respective movable inertial assembly. The central connecting bar 22 and the other sides of the frames 21 and 21' are not connected to the stationary anchoring areas.

Among tuning-fork gyroscopes, simple tuning-fork gyroscopes are distinguished from double tuning-fork gyroscopes.

Each movable inertial assembly 1 and 1' of a simple tuning-fork gyroscope, for example, is like that described in relation to the FIG. 3. The elements of the movable inertial assembly 1' have the same reference numbers as those of the assembly 1 along with a 'primed' sign.

Each inertial assembly 1 and 1' of a double tuning-fork gyroscope, described in relation to FIG. 5, comprises, for example, a central movable inertial mass 30, an inner intermediate inertial frame 40 which surrounds it, and an outer intermediate inertial frame 50 which surrounds the inner frame 40 and which is hence situated between the inner intermediate frame 40 and the outer frame 21.

The central mass 30, which is designated the proof mass, and the inner intermediate frame 40 can only move in an Oy direction (vertical axis in the plane of the figure); the outer intermediate frame 50 can move along the axis Oy and along the axis Ox. The sense axis of the gyroscope is the axis Oz. The outer intermediate inertial frame 50 is vibrated in the Ox direction; when the gyroscope rotates about its sense axis Oz, a vibration of the outer intermediate frame 50 along the Oy axis is generated. This vibration along Oy is transmitted to the inner intermediate frame 40, while the vibration along Ox is not transmitted. The vibration of the inner intermediate frame 40 along Oy is in phase with that of the outer intermediate frame 50. The vibration of the inner intermediate frame 40 along Oy is transmitted to the mass 30. The vibration of the mass 30 along Oy is in opposite phase to that of the inner frame 40 and of an amplitude proportional to the vibratory movement of the inner frame 40. The sensing movement is thus balanced within each of the two movable assemblies due to the fact that the movement of the proof mass 30 counterbalances the movement of the inner 40 and outer 50 intermediate frames.

The central mass 30 is connected to the anchoring area 34 by two beams 31 and 33 and to the second anchoring area 36 by two beams 35 and 37; the outer intermediate frame 50 is connected to the inner intermediate frame 40 by four flexural beams designated by the references 52, 54, 56, 58, as already described in the example of FIG. 3.

The inner intermediate frame 40 is connected to the central mass 30 by four flexural beams 41, 43, 45, 47, preferably folded in a U, arranged symmetrically in relation to the symmetry axes 32 and 38; other flexural beams 61, 63, 65, 67 connect this intermediate frame 40 to anchoring areas 34 and 36. These beams have a high stiffness along the x-axis and a low stiffness along the y-axis.

The combs for driving 70, for sensing the drive movement 80, and for error compensation 10*a* and 10*b* are linked to the outer intermediate frame 50 as already described previously with the examples of FIGS. 2 and 3. The sensor 90 and frequency adjustment 20 combs are linked to the central mass 30 as already described previously.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A gyroscope with a vibrating structure, produced by micromachining in a thin wafer, said gyroscope comprising:
   a movable inertial assembly comprising at least one movable mass able to vibrate in a plane of the wafer along a drive axis x and along a sense axis y roughly perpendicular to the x-axis,
   an interdigital sensor comb,
   an interdigital drive comb, and
   at least one additional interdigital comb, defining a first quadrature-error compensation comb, connected to the mass and which has two asymmetric air gaps e and $\lambda$e, $\lambda$ being a positive real number, for subjecting the mass to an adjustable electrostatic stiffness due to coupling between the x-axis and the y-axis by applying a variable DC voltage V to the quadrature-error compensation comb,
   wherein, when the gyroscope has a quadrature error, the adjustable stiffness allows compensation for the quadrature error of the gyroscope.

2. The gyroscope as claimed in claim 1, wherein the first quadrature-error compensation comb is arranged along the y-axis.

3. The gyroscope as claimed in claim 1, wherein when the movable inertial assembly has a symmetry axis parallel to the x-axis, the gyroscope further comprises a second quadrature-error compensation comb, the two compensation combs being arranged symmetrically in relation to the symmetry axis and wherein the second comb has along y two air gaps symmetrical to the air gaps of the first quadrature-error compensation comb relative to the symmetry axis.

4. The gyroscope as claimed in claim 2, wherein when the movable inertial assembly has a symmetry axis parallel to the y-axis, the gyroscope further comprises a third and a fourth quadrature-error compensation comb, said third and fourth quadrature-error compensation combs being respectively symmetrical to the first comb and a second comb in relation to the symmetry axis parallel to y.

5. The gyroscope as claimed in claim 3, wherein when the movable inertial assembly has a symmetry axis parallel to the y-axis, the gyroscope further comprises a third and a fourth quadrature-error compensation comb, said third and fourth quadrature-error compensation combs being respectively symmetrical to the first and second quadrature-error compensation combs in relation to the intersection between the symmetry axis parallel to x and the symmetry axis parallel to y.

6. The gyroscope as claimed in claim 1, wherein the movable inertial assembly includes a second mass able to vibrate along the sense axis y.

7. The gyroscope as claimed in claim 6, including a third mass able to vibrate in opposite phase to the second mass along the sense axis y.

8. The gyroscope as claimed in claim 1, wherein the movable inertial assembly furthermore comprises at least one interdigital comb for adjusting a sensing frequency which has two identical air gaps e' and which is linked with a mass able to vibrate along the sense axis y.

9. The gyroscope as claimed in claim 8, wherein the comb for adjusting the sensing frequency is positioned along the y-axis.

10. The gyroscope as claimed in claim 6, wherein the movable assembly is designated the first movable assembly, said gyroscope further comprises a second movable assembly which comprises the same elements as the first movable assembly and a coupling structure that links said first and second movable assemblies to each other and allows a transfer of mechanical vibration energy between them.

11. The gyroscope as claimed in claim 3, wherein the second quadrature-error compensation is arranged along the y-axis.

12. The gyroscope as claimed in claim 4, wherein the third and fourth quadrature-error compensations are arranged along the y-axis.

13. The gyroscope as claimed in claim 5, wherein the third and fourth quadrature-error compensations are arranged along the y-axis.

14. A simple or double tuning fork gyroscope as claimed in the claim 10.

* * * * *